(12) United States Patent
Peters et al.

(10) Patent No.: US 11,331,893 B2
(45) Date of Patent: May 17, 2022

(54) FILM APPLICATOR FOR CYLINDRICAL SENSOR WINDOW

(71) Applicant: Ford Global Technologies, LLC, Dearborn, MI (US)

(72) Inventors: Cindy Anne Peters, Canton, MI (US); Mark Edward Nichols, Saline, MI (US); Michael Robertson, Jr., Garden City, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 301 days.

(21) Appl. No.: 16/803,562

(22) Filed: Feb. 27, 2020

(65) Prior Publication Data
US 2021/0268785 A1    Sep. 2, 2021

(51) Int. Cl.
| | |
|---|---|
| *B32B 37/10* | (2006.01) |
| *B32B 37/00* | (2006.01) |
| *B32B 37/04* | (2006.01) |
| *B32B 38/18* | (2006.01) |
| *G01S 7/481* | (2006.01) |
| *B65H 37/04* | (2006.01) |
| *B65H 37/00* | (2006.01) |

(52) U.S. Cl.
CPC ............ *B32B 37/10* (2013.01); *B32B 37/003* (2013.01); *B32B 37/0046* (2013.01); *B32B 38/1841* (2013.01); *B65H 37/04* (2013.01); *G01S 7/4811* (2013.01); *B32B 2037/109* (2013.01); *B65H 37/005* (2013.01)

(58) Field of Classification Search
CPC ..... B32B 37/10; B32B 37/04; B32B 37/0046; B32B 37/003; B32B 38/1841; B32B 38/1866; B32B 2038/0064; B65H 37/004; B65H 37/005
See application file for complete search history.

(56) References Cited

U.S. PATENT DOCUMENTS

| | | | |
|---|---|---|---|
| 3,816,221 A * | 6/1974 | Shank, Jr. | ................. B65C 3/06 |
| | | | 156/566 |
| 7,839,491 B2 | 11/2010 | Harris et al. | |
| 8,345,099 B2 | 1/2013 | Bloom et al. | |
| 10,488,494 B2 | 11/2019 | Nichols et al. | |

(Continued)

FOREIGN PATENT DOCUMENTS

| | | |
|---|---|---|
| CN | 102131045 B1 | 7/2012 |
| WO | 2015010485 A1 | 1/2015 |

*Primary Examiner* — Alex B Efta
(74) *Attorney, Agent, or Firm* — Frank A. MacKenzie; Bejin Bieneman PLC (57) ABSTRACT

A film-application apparatus includes a body including a first body half, a second body half, and a hinge coupling the body halves; and a squeegee blade movable from a first position relative to the body to a second position relative to the body. The second body half is rotatable about the hinge relative to the first body half to a closed position. When the second body half is in the closed position, the body includes a top ring and a bottom ring both centered on an axis and defining an axial gap therebetween. When the second body half is in the closed position and the body is enclosing a sensor having a cylindrical sensor window, the axial gap exposes the cylindrical sensor window, and moving the squeegee blade from the first position to the second position covers substantially an entire surface area of the cylindrical sensor window.

17 Claims, 10 Drawing Sheets

(56) References Cited

U.S. PATENT DOCUMENTS

| | | | | |
|---|---|---|---|---|
| 2015/0277502 | A1* | 10/2015 | Witham | H04B 1/3888 |
| | | | | 269/287 |
| 2017/0182513 | A1* | 6/2017 | Cassoni | B44C 1/17 |
| 2019/0358945 | A1* | 11/2019 | Nishioka | B32B 37/003 |
| 2021/0046692 | A1* | 2/2021 | Vinson | G02B 1/14 |

* cited by examiner

FILM APPLICATOR FOR CYLINDRICAL SENSOR WINDOW

BACKGROUND

Vehicles, including those configured for autonomous or semi-autonomous operation, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

A film-application apparatus includes a body including a first body half, a second body half, and a hinge coupling the body halves; and a squeegee blade movable from a first position relative to the body to a second position relative to the body. The second body half is rotatable about the hinge relative to the first body half to a closed position. When the second body half is in the closed position, the body includes a top ring and a bottom ring both centered on an axis and defining an axial gap therebetween. When the second body half is in the closed position and the body is enclosing a sensor having a cylindrical sensor window, the axial gap exposes the cylindrical sensor window, and moving the squeegee blade from the first position to the second position covers substantially an entire surface area of the cylindrical sensor window.

The top ring may include a top interior cylindrical surface, the bottom ring may include a bottom interior cylindrical surface, and a radius of the top interior cylindrical surface may be substantially equal to a radius of the bottom interior cylindrical surface.

Each body half may include a top half-ring and a bottom half-ring, and when the second body half is in the closed position, the two top half-rings may form the top ring and the two bottom half-rings may form the bottom ring. Each body half may include a linkage connecting the respective top half-ring and the respective bottom half-ring, and each linkage may be radially outside the respective top and bottom half-rings. The hinge may couple the two linkages together.

Each top half-ring may include a top interior half-cylindrical surface, and each bottom half-ring may include a bottom interior half-cylindrical surface.

The squeegee blade may have an annular shape, the squeegee blade in the first position may be at the top ring, and the squeegee blade in the second position may be at the bottom ring.

The film-application apparatus may further include a circular clamp, and one of the top ring or the bottom ring may include an exterior circular groove sized to receive the circular clamp. The squeegee blade may have an annular shape, the squeegee blade in the first position may be abutting the clamp, and the squeegee blade in the second position may be abutting the other of the top ring or the bottom ring.

The squeegee blade may be elongated from the top ring to the bottom ring parallel to the axis. The film-application apparatus may further include a squeegee holder extending from the top ring to the bottom ring, and the squeegee blade may be mounted to the squeegee holder. The squeegee blade may include a resilient member contacting the squeegee holder and biasing the squeegee blade away from the squeegee holder.

The top ring may include a top track, the bottom ring may include a bottom track, and the squeegee holder may include a top peg slidable in the top track and a bottom peg slidable in the bottom track. The top ring may include a top exterior cylindrical surface, the bottom ring may include a bottom exterior cylindrical surface, the top track may extend circumferentially along the top exterior cylindrical surface, and the bottom track may extend circumferentially along the bottom exterior cylindrical surface.

The top track may include a top entry point, the bottom track may include a bottom entry point, the top peg may be removable from the top track only at the top entry point, and the bottom peg may be removable from the bottom track only at the bottom entry point.

The film-application apparatus may further include a film roller rotatably coupled to the squeegee holder. The film roller may have an axis of rotation parallel to the axis.

With reference to the Figures, a film-application apparatus 30 includes a body 32 including a first body half 34, a second body half 36, and a hinge 38 coupling the body halves 34, 36; and a squeegee blade 40 movable from a first position relative to the body 32 to a second position relative to the body 32. The second body half 36 is rotatable about the hinge 38 relative to the first body half 34 to a closed position. When the second body half 36 is in the closed position, the body 32 includes a top ring 42 and a bottom ring 44 both centered on an axis A and defining an axial gap 46 therebetween. When the second body half 36 is in the closed position and the body 32 is enclosing a sensor 48 having a cylindrical sensor window 50, the axial gap 46 exposes the cylindrical sensor window 50, and moving the squeegee blade 40 from the first position to the second position covers substantially an entire surface area of the cylindrical sensor window 50.

The film-application apparatus 30 can be used to apply a film 52 to the cylindrical sensor window 50 of the sensor 48. The film 52 can absorb damage from the environment, such as hail, dust, impacts from road debris, extensive sun exposure, etc., rather than that damage occurring to the cylindrical sensor window 50. The film 52 can then be replaced without removing or replacing the cylindrical sensor window 50 or other components of the sensor 48, which lengthens the lifespan of the sensor 48 and is significantly cheaper than replacing the sensor 48. Periodically replacing the film 52 lowers the cost of ownership of a vehicle incorporating the sensor 48. The film-application apparatus 30 facilitates quick, easy, and reliable application of the film 52 to the cylindrical sensor window 50, despite the nonflat shape of the surface to which the film 52 is applied. The film-application apparatus 30 serves as a guide for proper placement of the film 52 by physically demarcating where the top edge and/or bottom edge of the film 52 should line up, which can prevent even slight skews of the film 52. If the film 52 is applied circumferentially around the cylindrical sensor window 50, a slight skew of the leading edge of the film 52 magnifies to a larger displacement by the trailing edge of the film 52. The movement of the squeegee blade 40 removes bubbles between the film 52 and the cylindrical sensor window 50. The shape of the body 32 provides a guide for moving the squeegee blade 40 to follow a nonflat, specifically cylindrical, surface. The squeegee blade 40 can thus remove bubbles despite the shape of the cylindrical sensor window 50.

Figure 1:
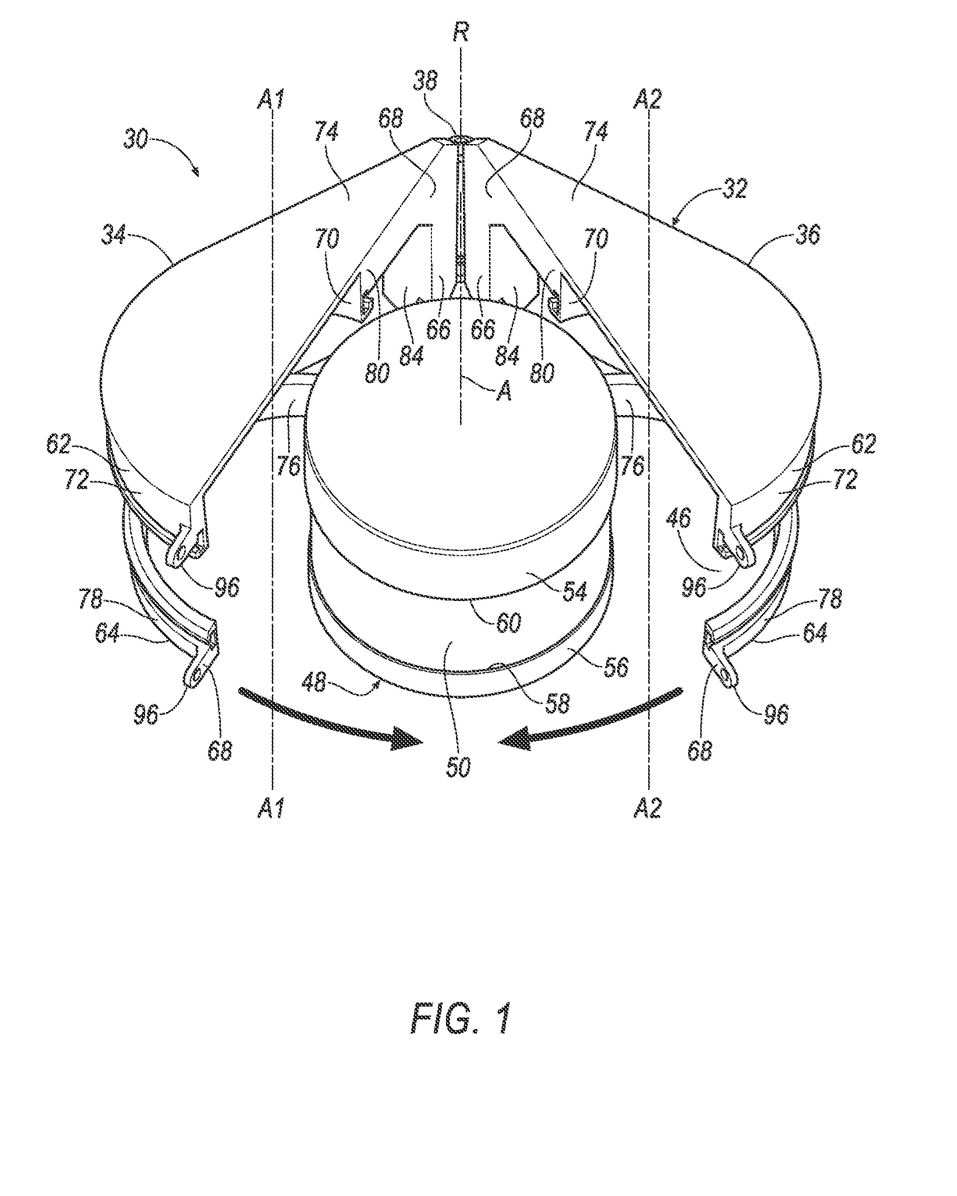
FIG. 1 is a perspective view of a sensor and a body of a film-application apparatus in an open position.

With reference to FIG. 1, the sensor 48 can detect the external world, e.g., objects and/or characteristics of surroundings of a vehicle (not shown) to which the sensor 48 is mounted, such as other vehicles, road lane markings, traffic lights and/or signs, pedestrians, etc. For example, the sensor 48 may be a radar sensor, scanning laser range finder, light detection and ranging (LIDAR) device, or image processing sensor such as a camera. In particular, the sensor 48 can be a LIDAR device. A LIDAR device detects distances to objects by emitting laser pulses and measuring the time of flight for the pulse to travel to the object and back.

The sensor 48 includes an upper sensor housing 54, a lower sensor housing 56, and the cylindrical sensor window 50. The upper sensor housing 54 is disposed directly above the cylindrical sensor window 50, and the cylindrical sensor window 50 is disposed directly above the lower sensor housing 56. The upper sensor housing 54 is attached to and contacts the cylindrical sensor window 50, and the cylindrical sensor window 50 is attached to and contacts the lower sensor housing 56. The upper sensor housing 54 and the lower sensor housing 56 are cylindrical and have outer diameters substantially equal to the outer diameter of the cylindrical sensor window 50.

The cylindrical sensor window 50 is cylindrical and hollow. The cylindrical sensor window 50 defines the axis A. The cylindrical sensor window 50 extends along the axis A from a bottom edge 58 contacting the lower sensor housing 56 to a top edge 60 contacting the upper sensor housing 54. The cylindrical sensor window 50 is transparent at least to, i.e., allows to substantially pass, a wavelength of light emitted by the sensor 48. The sensor 48 has a 360° horizontal field of view through the cylindrical sensor window 50.

Once applied, the film 52 covers the cylindrical sensor window 50. The film 52 is in contact with an outer surface of the cylindrical sensor window 50. The film 52 extends fully or partially about the axis A. The film 52 extends from the bottom edge 58 to the top edge 60 of the cylindrical sensor window 50. The film 52 may extend onto the lower sensor housing 56 or upper sensor housing 54, or the film 52 may cover only the cylindrical sensor window 50.

The film 52 may be formed of any material that is suitably transparent to the sensor 48 and suitably flexible to take the shape of the cylindrical sensor window 50, for example, polycarbonate, acrylic, poly(methyl methacrylate) (PMMA), polyurethane, fluoropolymer, etc. The film 52 may be approximately 1 millimeter thick. The film 52 may be removable from the cylindrical sensor window 50. In other words, an operator may be able to peel the film 52 off the cylindrical sensor window 50 without damaging or permanently obscuring the cylindrical sensor window 50.

For example, the film 52 may be a cling film. In other words, the film 52 may bond to a surface such as the cylindrical sensor window 50 via static electricity, that is, without adhesive.

Alternatively, the film 52 may include adhesive attaching the film 52 to the cylindrical sensor window 50. The adhesive may be a pressure-sensitive adhesive, in other words, an adhesive whose bonding is activated by applying pressure, as opposed to, e.g., curing. The adhesive may be a removable adhesive; that is, the bonding of the adhesive to the cylindrical sensor window 50 may be reversible. The adhesive may be bonded more strongly to the film 52 than to the cylindrical sensor window 50, and the adhesive may be bonded more strongly to itself than to the cylindrical sensor window 50; in other words, if the film 52 is removed from the cylindrical sensor window 50, the adhesive will stick to itself and to the film 52 rather than to the cylindrical sensor window 50. Thus, the adhesive will not leave residue on the cylindrical sensor window 50.

The film 52 may include a surface treatment. The surface treatment may be on an opposite side of the film 52 than the adhesive, if any. The surface treatment may make the surface hydrophobic, i.e., repellent to water; superhydrophobic, i.e., having a contact angle with water greater than 150°; or omniphobic, i.e., repellent to both water and to oily liquids. The surface treatment may be a coating applied to the surface. Alternatively, the surface treatment may be processing or treating the surface to change the material surface structure, e.g., applying plasma, flame, etc., patterning the surface through embossing, chemical etching, etc.

Figure 2:
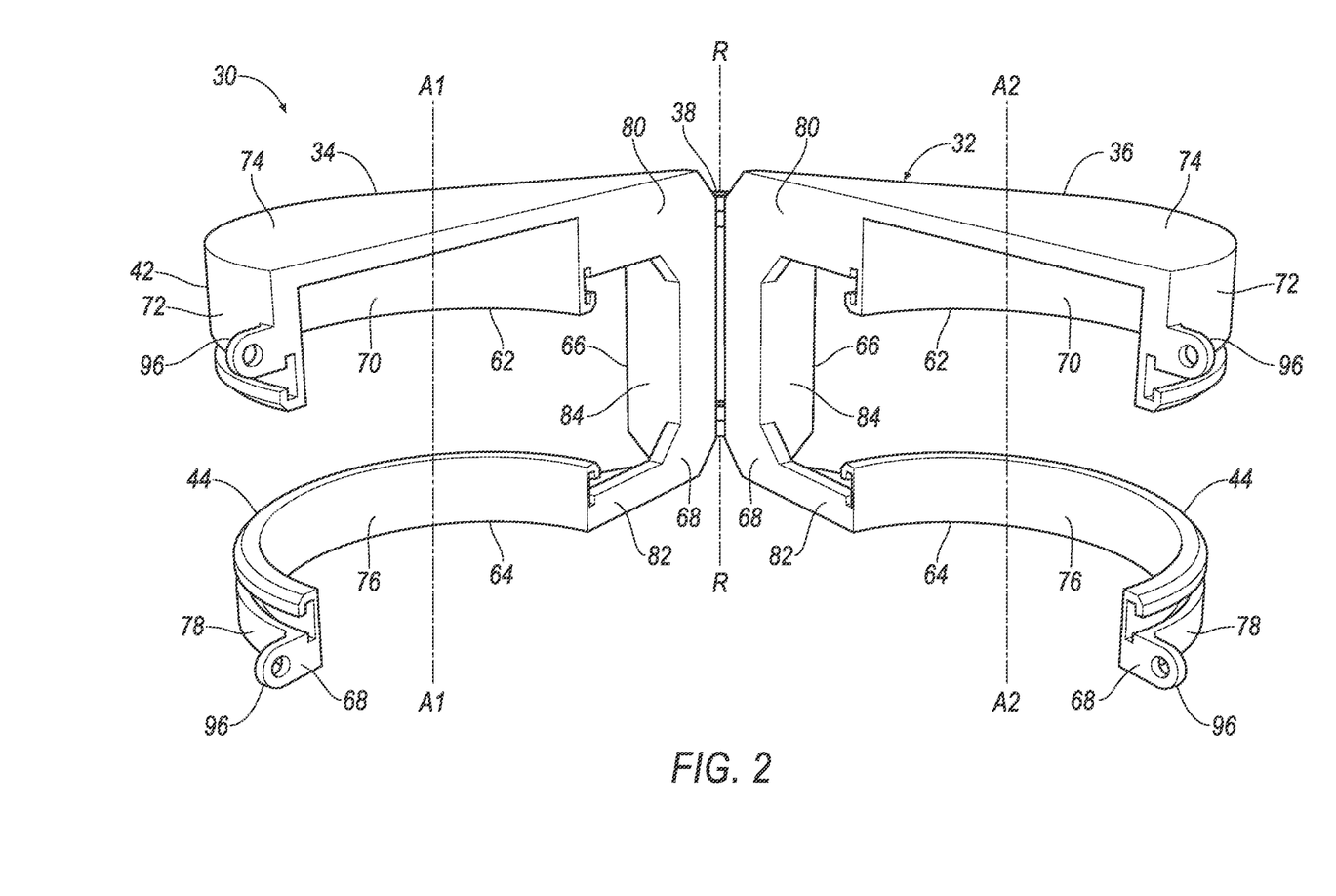
FIG. 2 is a perspective view of the body of the film-application apparatus in the open position.

With reference to FIG. 2, the body 32 includes the first body half 34, the second body half 36, and the hinge 38 rotatably coupling the body halves 34, 36. Each body half 34, 36 includes a top half-ring 62, a bottom half-ring 64, and a linkage 66 connecting the top half-ring 62 and the bottom half-ring 64. The top half-ring 62 and bottom half-ring 64 of the first body half 34 define a first axis A1, and the top half-ring 62 and bottom half-ring 64 of the second body half 36 define a second axis A2. When the second body half 36 is in the closed position, the first axis A1 and the second axis A2 are coextensive with and are the same as the axis A.

Each body half 34, 36 includes a flat mating surface 68 at which the body halves 34, 36 contact each other when the second body half 36 is in the closed position. The shape of the second body half 36 is the same as the shape of the first body half 34 reflected across the mating surface 68 of the first body half 34.

The body halves 34, 36 are each made of a single, uniform piece of material with no seams, joints, fasteners, or adhesives holding it together. For example, the body halves 34, 36 are each injection-molded.

Each body half 34, 36 includes the respective top half-ring 62. Each top half-ring 62 has a half-cylindrical shape extending substantially 180° around the respective axis A1 or A2. Each top half-ring 62 includes a top interior half-cylindrical surface 70 and a top exterior half-cylindrical surface 72. The top interior half-cylindrical surface 70 extends 180° circumferentially around the respective axis A1 or A2 and faces radially inward. A radius of the top interior half-cylindrical surface 70 is substantially equal to a radius of the upper sensor housing 54. The top exterior half-cylindrical surface 72 extends 180° circumferentially around the respective axis A1 or A2 and faces radially outward. The top exterior half-cylindrical surface 72 is positioned radially outside of the top interior half-cylindrical surface 70 relative to the respective axis A1 or A2.

Each body half 34, 36 includes a respective top half-panel 74. Each top half-panel 74 is positioned at a top of the respective top half-ring 62 and extends from the respective top half-ring 62 radially inward to the respective axis A1 or A2. Each top half-panel 74 has a flat shape. Each top half-panel 74 is shaped like semicircle centered on the respective axis A1 or A2 with a triangular extension.

Each body half 34, 36 includes the respective bottom half-ring 64. Each bottom half-ring 64 has a half-cylindrical shape extending substantially 180° around the respective axis A1 or A2. Each bottom half-ring 64 includes a bottom interior half-cylindrical surface 76 and a bottom exterior half-cylindrical surface 78. The bottom interior half-cylindrical surface 76 extends 180° circumferentially around the respective axis A1 or A2 and faces radially inward. A radius of the bottom interior half-cylindrical surface 76 is substantially equal to a radius of the lower sensor housing 56. The bottom exterior half-cylindrical surface 78 extends 180° circumferentially around the respective axis A1 or A2 and faces radially outward. The bottom exterior half-cylindrical surface 78 is positioned radially outside of the bottom interior half-cylindrical surface 76 relative to the respective axis A1 or A2.

Each body half 34, 36 includes the respective linkage 66 connecting the respective top half-ring 62 and the respective bottom half-ring 64. Each linkage 66 is positioned radially outside the respective the respective top half-ring 62 and bottom half-ring 64. Each linkage 66 includes a top portion 80 elongated radially outward from the respective top exterior half-cylindrical surface 72, a bottom portion 82 elongated radially outward from the respective bottom exterior half-cylindrical surface 78, and an axial portion 84 elongated parallel to the respective axis A1 or A2 from the top portion 80 to the bottom portion 82. The axial portion 84 is radially spaced from the respective top exterior half-cylindrical surface 72 and from the respective bottom exterior half-cylindrical surface 78. The top portion 80, axial portion 84, and bottom portion 82 of each linkage 66 form a "C" shape. The linkages 66 are positioned out of the way of the sensor 48 and provide a handhold for a technician using the film-application apparatus 30.

Figure 3:
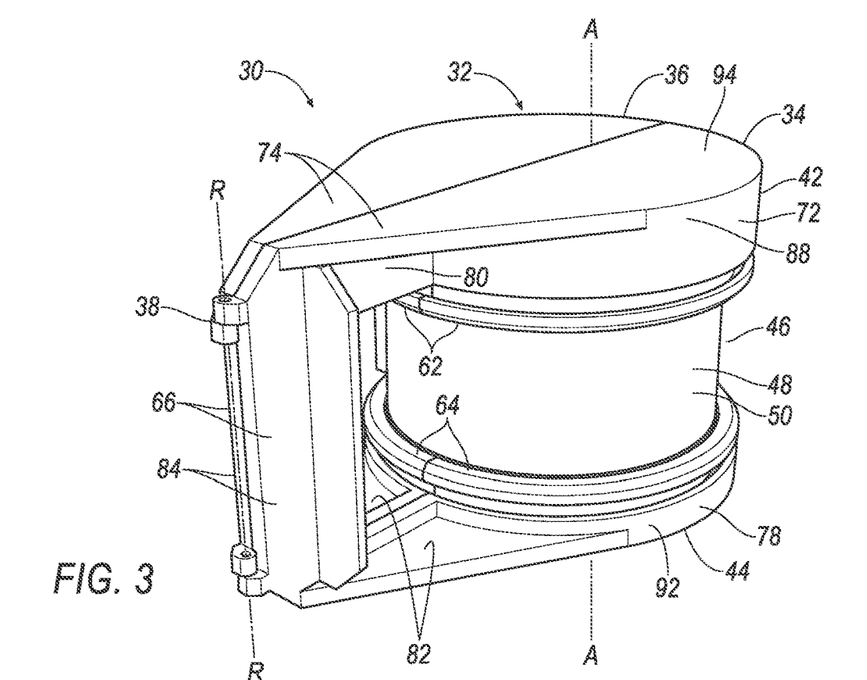
FIG. 3 is a rear perspective view of the body of the film-application apparatus in a closed position.

With reference to FIG. 3, the hinge 38 couples the two linkages 66 together. The hinge 38 is attached to the linkages 66 at the axial portions 84. The first body half 34 and second body half 36 are rotatably coupled to each other via the hinge 38. The hinge 38 defines an axis of rotation R that is parallel to the axes A1, A2, A. The second body half 36 is rotatable about the hinge 38 relative to the first body half 34 from an open position to a closed position. When the second body half 36 is in an open position relative to the first body half 34, the body halves 34, 36 contact each other only at the hinge 38. When the second body half 36 is in the closed position relative to the first body half 34, the body halves 34, 36 contact each other along the mating surfaces 68 in addition to at the hinge 38.

When the second body half 36 is in the closed position, the body 32 includes the top ring 42 and the bottom ring 44 both centered on the axis A. The two top half-rings 62 form the top ring 42, and the two bottom half-rings 64 form the bottom ring 44. The top ring 42 includes a top interior cylindrical surface 86 and a top exterior cylindrical surface 88, and the bottom ring 44 includes a bottom interior cylindrical surface 90 and a bottom exterior cylindrical surface 92. The two top interior half-cylindrical surfaces 70 form the top interior cylindrical surface 86 having a radius and centered on the axis A, the two top exterior half-cylindrical surfaces 72 form the top exterior cylindrical surface 88 having a radius and centered on the axis A, the two bottom interior half-cylindrical surfaces 76 form the bottom interior cylindrical surface 90 having a radius and centered on the axis A, and the two bottom exterior half-cylindrical surfaces 78 form the bottom exterior cylindrical surface 92 having a radius and centered on the axis A. The radius of the top interior cylindrical surface 86 is substantially equal to the radius of the upper sensor housing 54, and the radius of the bottom interior cylindrical surface 90 is substantially equal to the radius of the lower sensor housing 56. The radii of the top interior cylindrical surface 86 and the bottom interior cylindrical surface 90 are substantially equal. The two top half-panels 74 form a top panel 94 shaped like a circle centered on the axis A with a triangular extension having two vertices tangent to the circle and a vertex at the axis of rotation R.

Figure 4:
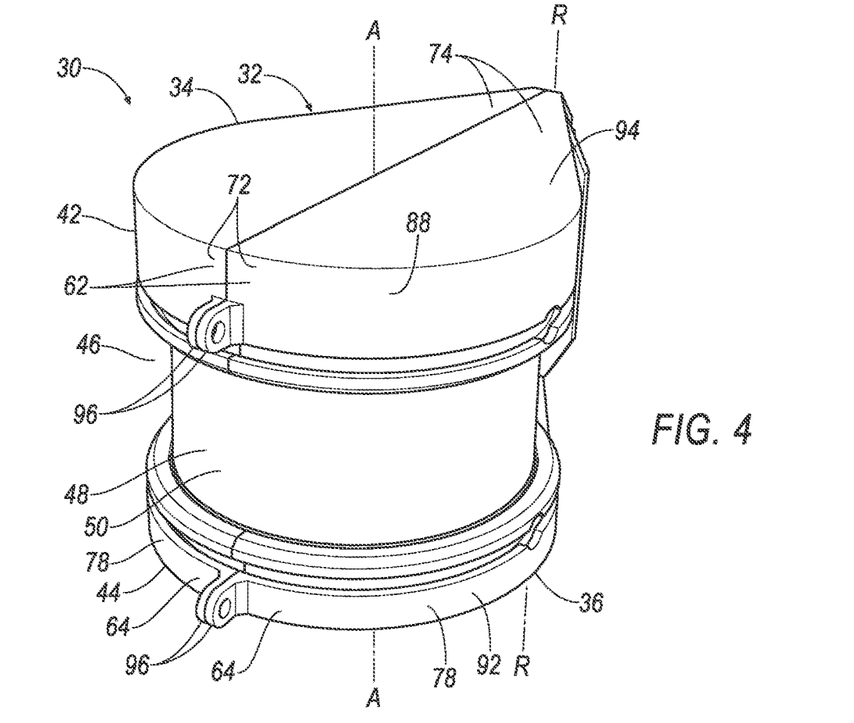
FIG. 4 is a perspective view of the body of the film-application apparatus in the closed position.

With reference to FIG. 4, the top ring 42 and the bottom ring 44 define the axial gap 46 therebetween. The film-application apparatus 30 does not have any components that are axially between the top ring 42 and the bottom ring 44 and radially inside of the top ring 42 or bottom ring 44; in other words, a cylindrical space extending from the top ring 42 to the bottom ring 44, centered on the axis A, and having a radius equal to the top exterior cylindrical surface 88 is empty of components of the film-application apparatus 30, permitting the space to be occupied by the sensor 48. When the second body half 36 is in the closed position and the body 32 is enclosing the sensor 48, the axial gap 46 exposes the cylindrical sensor window 50. Moreover, a space directly radially inward from the top interior cylindrical surface 86 and a space directly radially inward from the bottom interior cylindrical surface 90 are empty of components of the film-application apparatus 30 to provide space for the sensor 48, specifically for the upper sensor housing 54 and the lower sensor housing 56.

The body halves 34, 36 include corresponding closure points 96 that meet when the second body half 36 is in the closed position. Each body half 34, 36 includes one closure point 96 extending radially outward from the top half-ring 62 and one closure point 96 extending radially outward from the bottom half-ring 64. When the second body half 36 is in the closed position, the two closure points 96 extending from the top half-rings 62 meet, and the two closure points 96 extending from the bottom half-rings 64 meet. The closure points 96 permit the body halves 34, 36 to be locked together to keep the second body half 36 in the closed position. For example, the closure points 96 can provide slots for pins (not shown) to hold the body halves 34, 36 together.

When the second body half 36 is in the closed position, the mating surfaces 68 coextensively contact each other. Each mating surface 68 extends along two ends of the respective top half-ring 62; an edge of the respective top half-panel 74; the top portion 80, axial portion 84, and bottom portion 82 of the respective linkage 66; two ends of the respective bottom half-ring 64; and the closure points 96.

Figure 10:
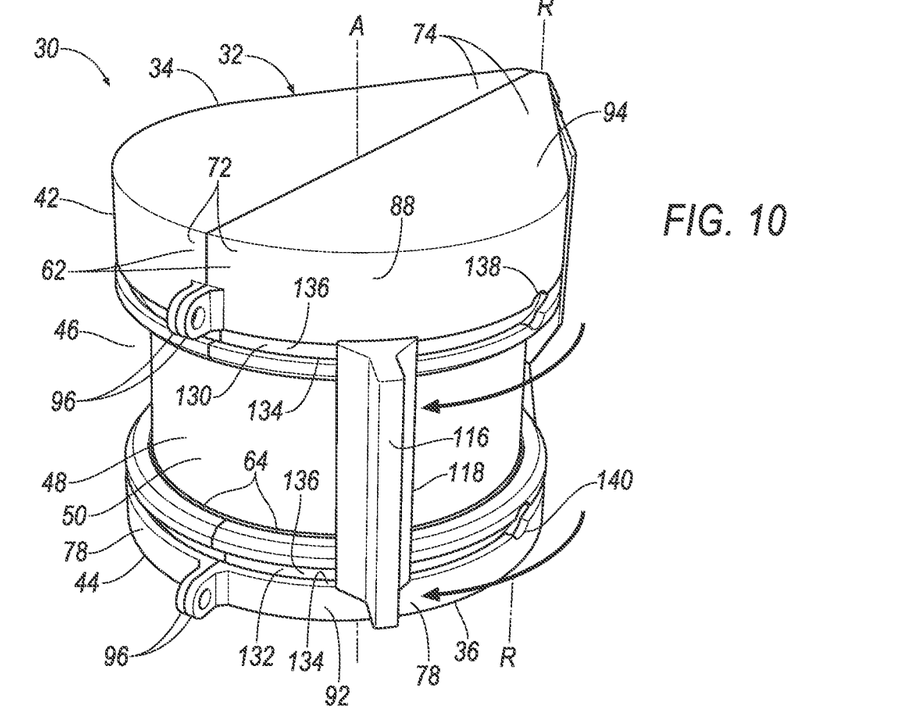
FIG. 10 is a perspective view of the film-application apparatus of FIG. 8 with the body in the closed position and the squeegee blade moving from the first position to the second position.
Figure 11:
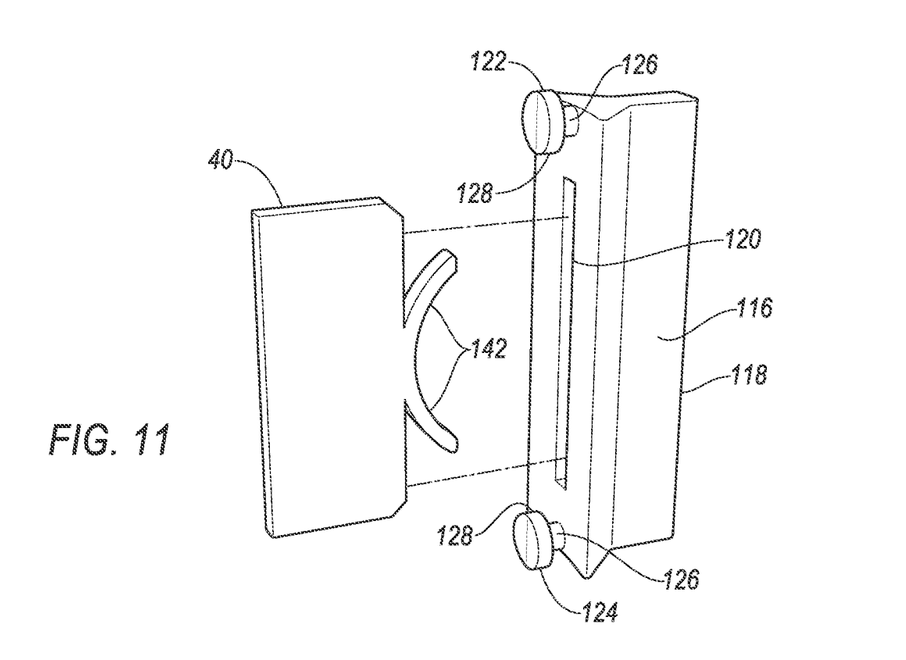
FIG. 11 is a perspective exploded view of the squeegee blade and a squeegee holder of the film-application apparatus of FIG. 8.
Figure 12:
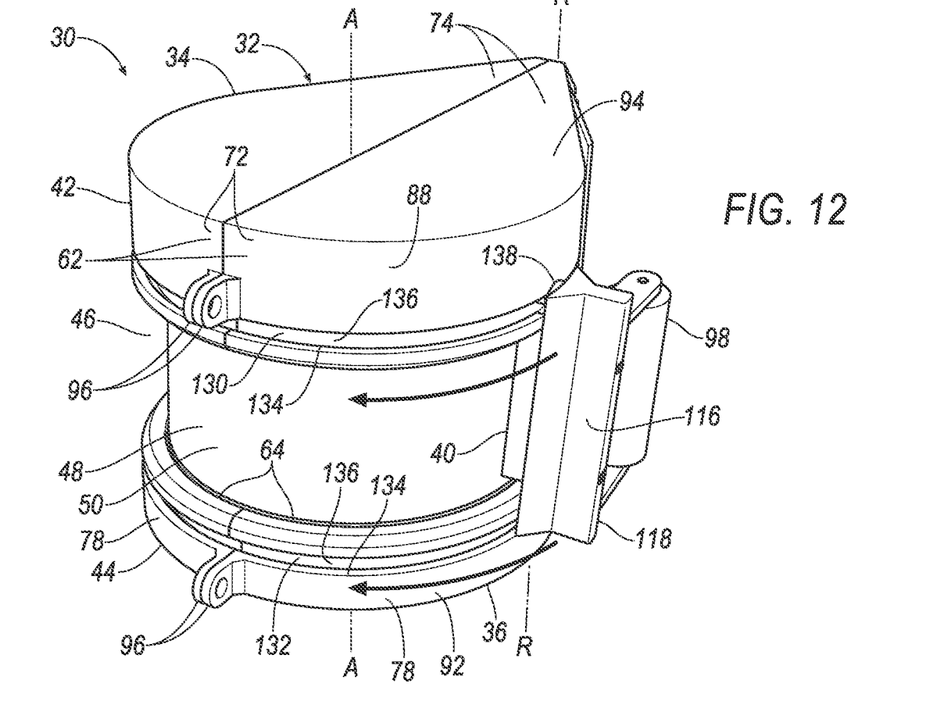
FIG. 12 is a perspective view of a third example of the film-application apparatus with the body in the closed position and the squeegee blade in the first and second positions.
Figure 13:
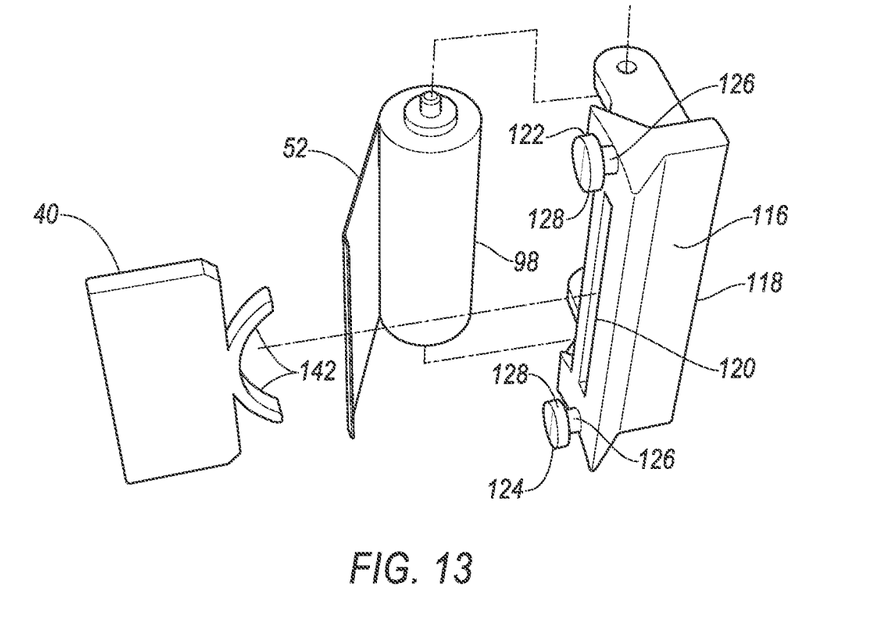
FIG. 13 is a perspective exploded view of the squeegee blade, the squeegee holder, and a film roller of the film-application apparatus of FIG. 12.

With reference generally to FIGS. 5-13, the squeegee blade 40 is movable from the first position relative to the body 32 to the second position relative to the body 32. Moving the squeegee blade 40 from the first position to the second position covers substantially an entire surface area of the cylindrical sensor window 50. FIGS. 5-7B show a first example of the film-application apparatus 30 in which the squeegee blade 40 extends circumferentially around the cylindrical sensor window 50 and moves axially from the first position to the second position. FIGS. 8-11 show a second example of the film-application apparatus 30 in which the squeegee blade 40 extends axially along the cylindrical sensor window 50 and moves circumferentially from the first position 360° to the second position, which is the same as the first position. FIGS. 12-13 show a third example of the film-application apparatus 30 having the squeegee blade 40 similar to the second example and having a film roller 98 fixed to the squeegee blade 40.

With reference to FIGS. 5-7B, in the first example of the film-application apparatus 30, the film-application apparatus 30 includes a circular clamp 100. The circular clamp 100 is formed of two semicircular clamp halves 102 that are attachable to and detachable from each other. The circular clamp 100 includes an axial wall 104 extending circumferentially, an upper flange 106 extending radially inward from a top end of the axial wall 104, and a lower flange 108 extending radially inward from a bottom end of the axial wall 104. The lower flange 108 extends farther radially inward than does the upper flange 106.

The circular clamp 100 is sized to attach to the body 32 and hold the body halves 34, 36 in place relative to each other. One of the top ring 42 or the bottom ring 44 includes an exterior circular groove 110 sized to receive the circular clamp 100. For example, the top ring 42 can include the groove 110. The groove 110 can extend radially inward from the top exterior cylindrical surface 88. An inner radius of the axial wall 104 can be substantially equal to a radius of the top exterior cylindrical surface 88, an axial distance from the groove 110 to a bottom edge of the top ring 42 can be substantially equal to an axial distance from the upper flange 106 to the lower flange 108, and an inner radius of the lower flange 108 can be substantially equal to a radius of the top interior cylindrical surface 86. The circular clamp 100 can be attached to the body 32 so that the upper flange 106 sits in the groove 110, the axial wall 104 abuts the top exterior cylindrical surface 88, and the lower flange 108 abuts a bottom edge of the top ring 42.

Figure 5:
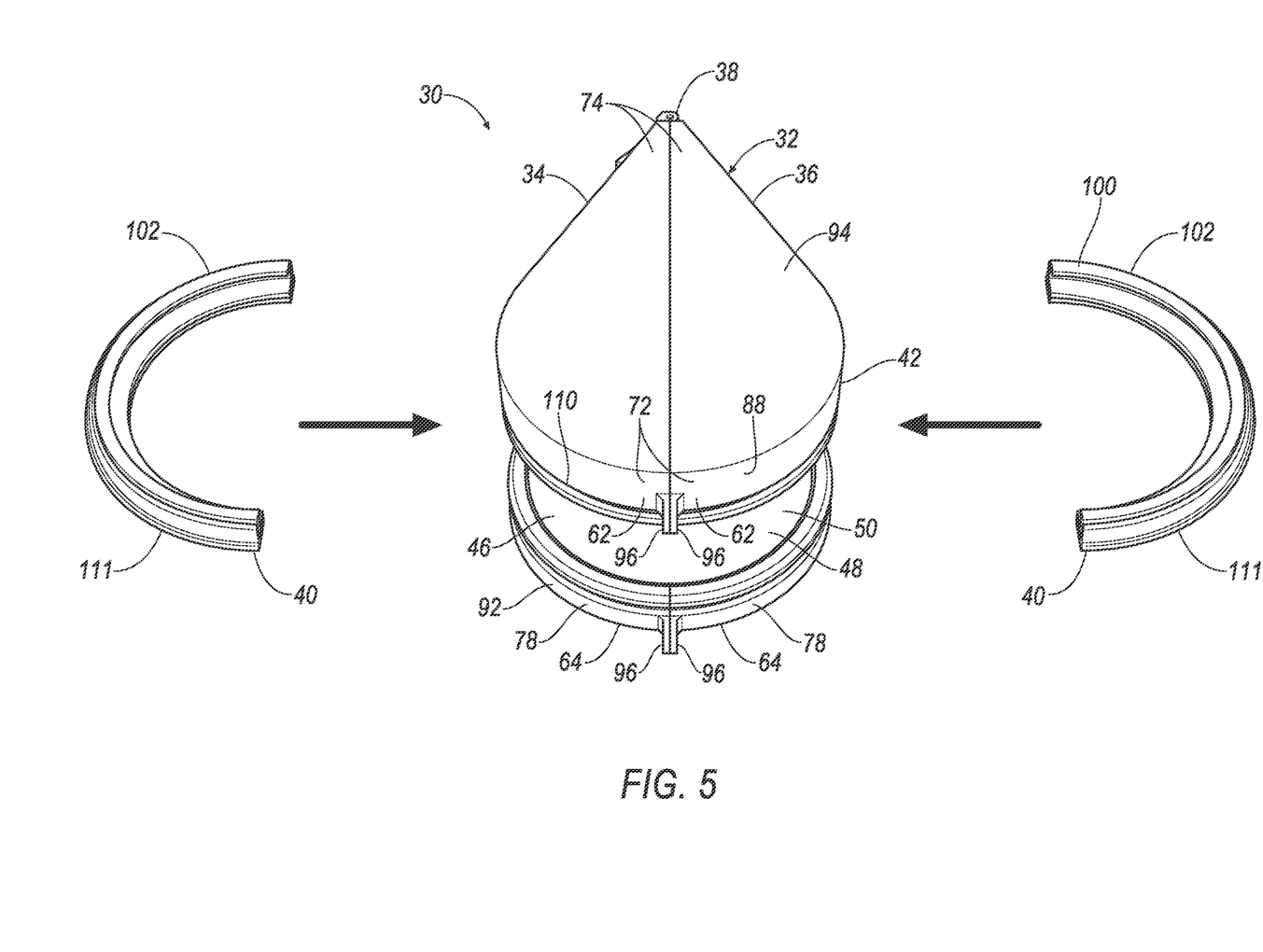
FIG. 5 is a perspective view of a first example of the film-application apparatus with the body in the closed position and a squeegee blade of the film-application apparatus in a detached position.

The squeegee blade 40 has an annular shape that, when attached to the body 32, extends circumferentially around the axis A. The squeegee blade 40 includes two semicircular squeegee-blade halves 111 that are attachable and detachable to each other. The squeegee blade 40 includes a support portion 112 extending circumferentially and a blade portion 114 extending radially inward from the support portion 112. When the squeegee blade 40 is in the first position, the support portion 112 extends circumferentially around and abuts the axial wall 104 of the circular clamp 100, and the blade portion 114 extends directly below the lower flange 108 of the circular clamp 100. An inner radius of the support portion 112 is substantially equal to an outer radius of the axial wall 104. The circular clamp 100 and the squeegee blade 40 can be attached to the body 32 as a unit, as shown in FIG. 5.

Figure 6A:
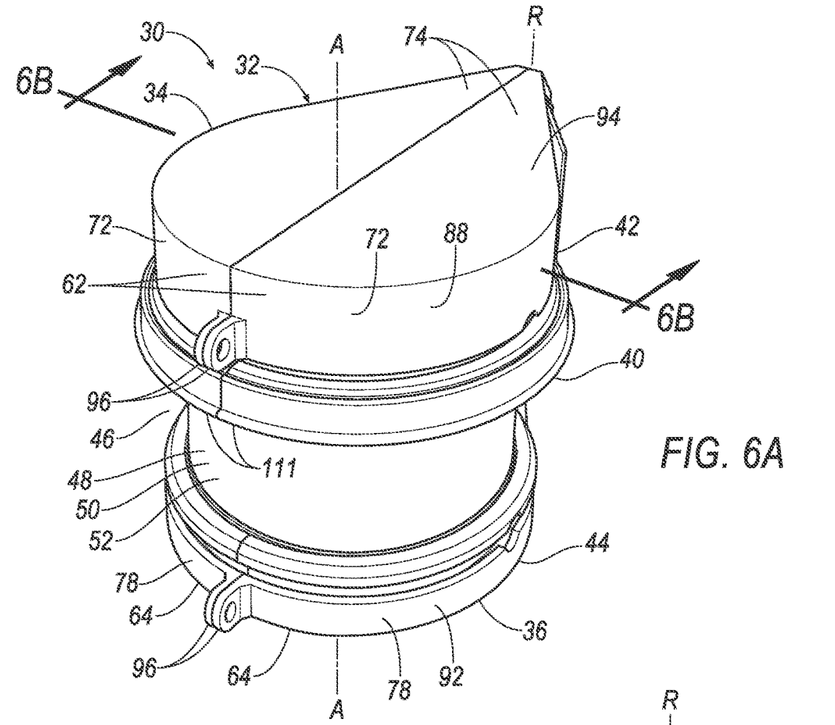
FIG. 6A is a perspective view of the film-application apparatus of FIG. 5 with the body in the closed position and the squeegee blade in a first position.
Figure 6B:
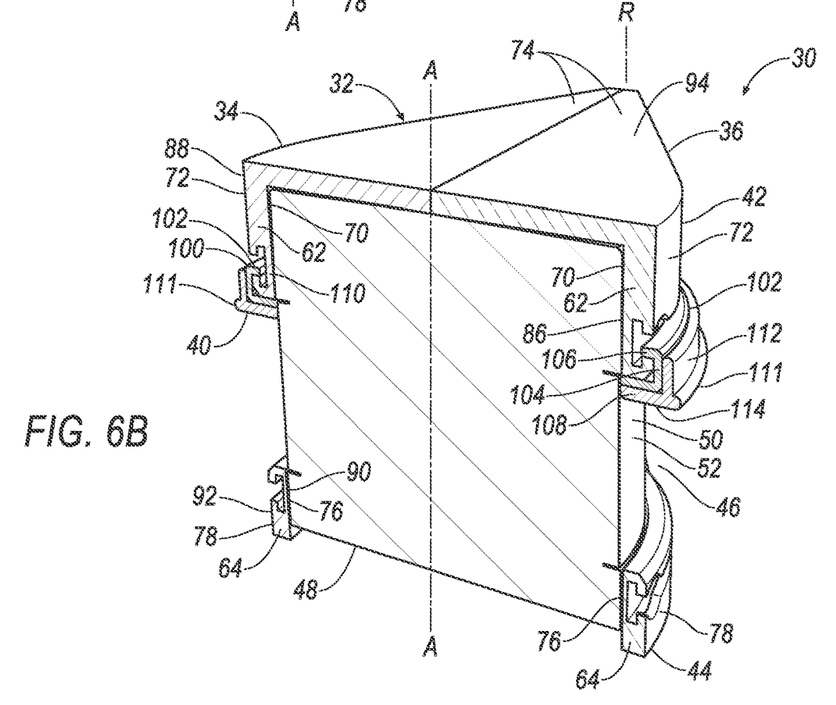
FIG. 6B is a cross-sectional view of the film-application apparatus of FIG. 5 with the body in the closed position and the squeegee blade in the first position.
Figure 7A:
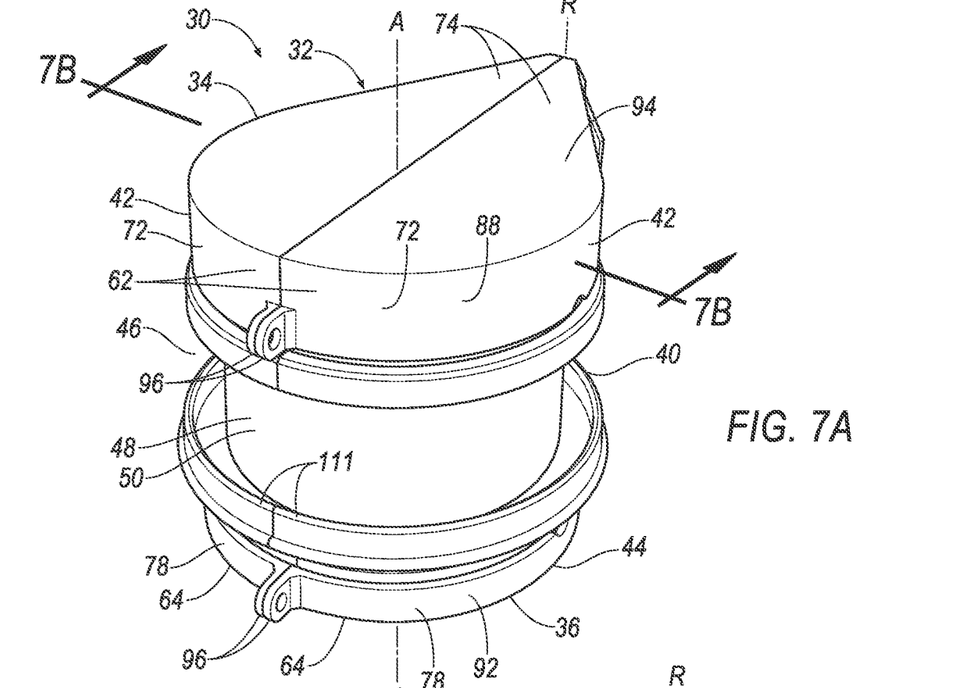
FIG. 7A is a perspective view of the film-application apparatus of FIG. 5 with the body in the closed position and the squeegee blade in a second position.
Figure 7B:
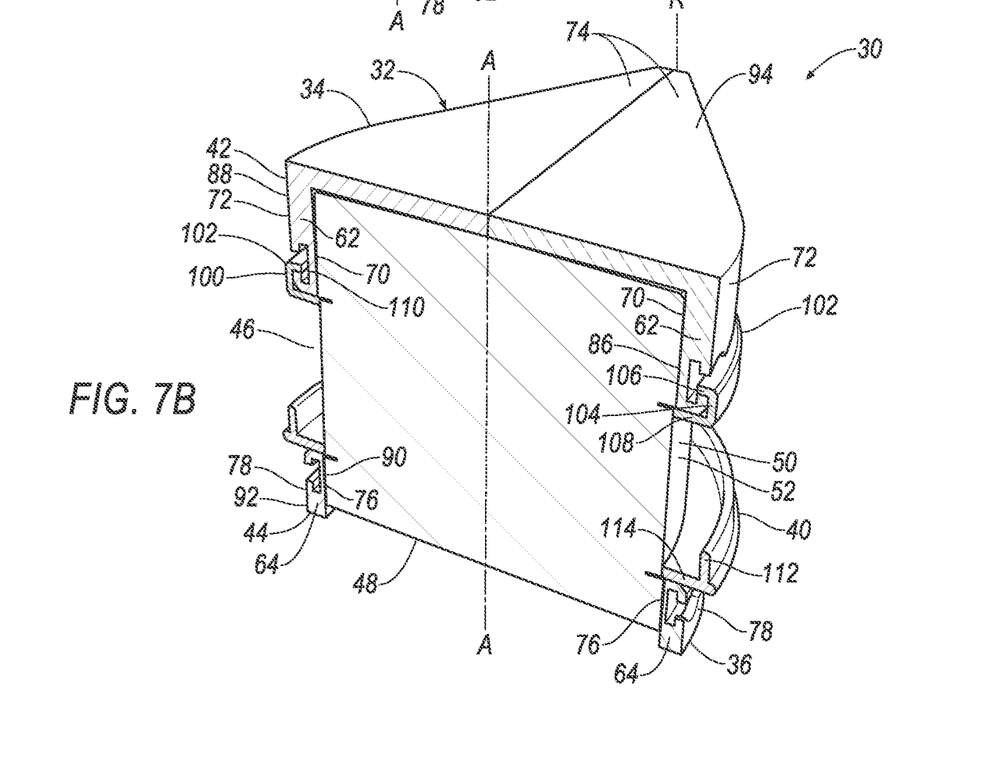
FIG. 7B is a cross-sectional view of the film-application apparatus of FIG. 5 with the body in the closed position and the squeegee blade in the second position.

The squeegee blade 40 in the first position is at the top ring 42 (or at the bottom ring 44 if the bottom ring 44 includes the groove 110) abutting the clamp, as shown in FIGS. 6A-B, and the squeegee blade 40 in the second position is abutting the bottom ring 44 (or top ring 42 if the bottom ring 44 includes the groove 110), as shown in FIGS. 7A-B. Moving the squeegee blade 40 from the first position to the second position covers substantially an entire area of the cylindrical sensor window 50. The squeegee blade 40 extends circumferentially 360° around the cylindrical sensor window 50, and movement from the first position to the second position covers an entire axial length of the cylindrical sensor window 50.

Figure 9:
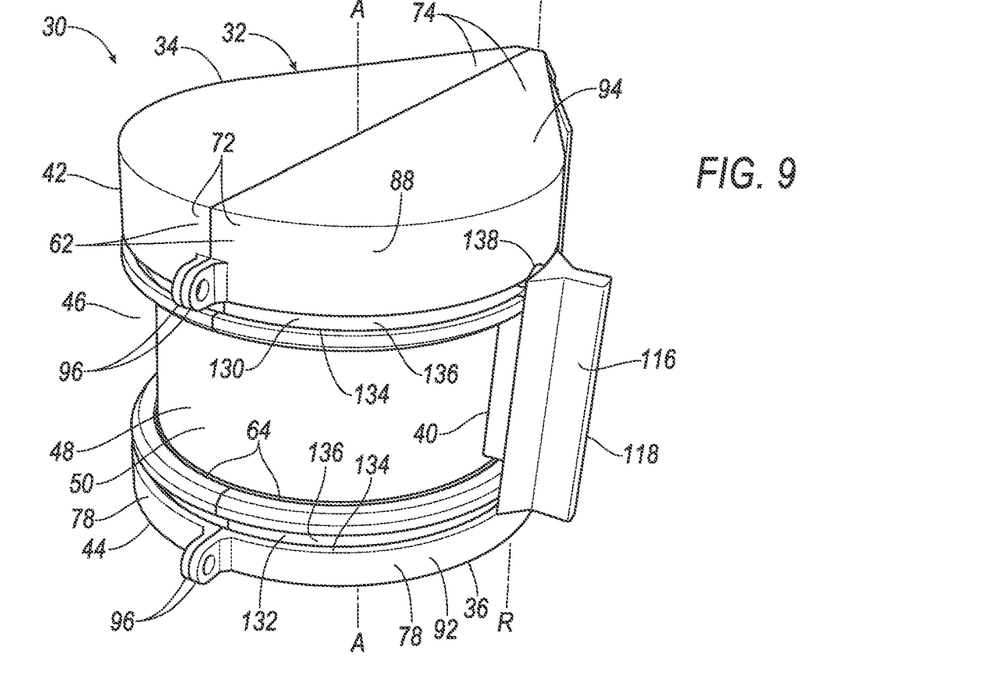
FIG. 9 is a perspective view of the film-application apparatus of FIG. 8 with the body in the closed position and the squeegee blade in the first and second positions.

With reference to FIGS. 8-11, in the second example of the film-application apparatus 30, the film-application apparatus 30 includes a squeegee holder 116, as best seen in FIG. 11. The squeegee holder 116 is elongated axially, i.e., parallel to the axis A, from the top ring 42 to the bottom ring 44. The squeegee holder 116 includes a squeegee-holder body 118, a squeegee-blade slot 120 extending into the squeegee-holder body 118 and extending axially along the squeegee-holder body 118, a top peg 122 extending away from the squeegee-holder body 118 and positioned axially above the squeegee-blade slot 120, and a bottom peg 124 extending away from the squeegee-holder body 118 and positioned axially below the squeegee-blade slot 120. The pegs 122, 124 each include a stem 126 and a flared end 128.

Figure 8:
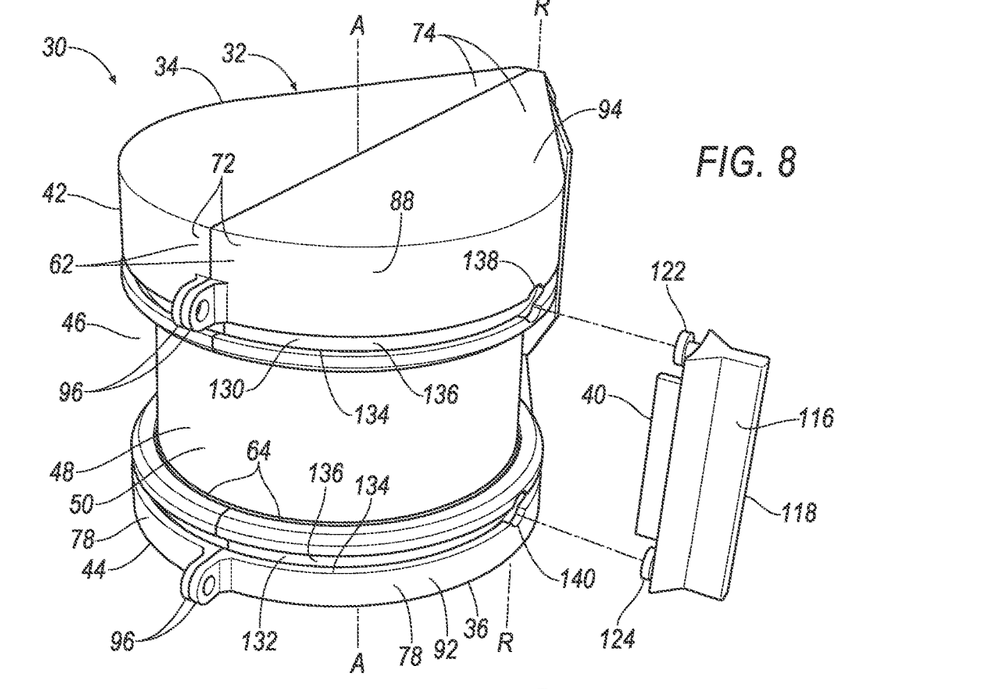
FIG. 8 is a perspective view of a second example of the film-application apparatus with the body in the closed position and the squeegee blade in the detached position.

With reference to FIGS. 8-10, the top ring 42 includes a top track 130, and the bottom ring 44 includes a bottom track 132. The top track 130 extends circumferentially along the top exterior cylindrical surface 88 for 360°, and the bottom track 132 extends circumferentially along the bottom exterior cylindrical surface 92 for 360°. The tracks 130, 132 are sized and positioned to receive the respective pegs 122, 124 and permit the pegs 122, 124 to slide along the tracks 130, 132. An axial distance between the tracks 130, 132 is substantially equal to a distance between the pegs 122, 124. The tracks 130, 132 include a narrow portion 134 at the top exterior cylindrical surface 88 or bottom exterior cylindrical surface 92 and a wide portion 136 radially inside the narrow portion 134. The narrow portion 134 is wider than the stem 126 but narrower than the flared end 128, and the wide portion 136 is wider than the flared end 128. The top track 130 includes a top entry point 138, and the bottom track 132 includes a bottom entry point 140. The entry points 138, 140 are wider than the flared end 128 and extend from the top exterior cylindrical surface 88 or bottom exterior cylindrical surface 92 radially inward to the wide portion 136. The top peg 122 can enter and be removed from the top track 130 only at the top entry point 138, the bottom peg 124 can enter and be removed from the bottom track 132 only at the bottom entry point 140, and the pegs 122, 124 can slide along the tracks 130, 132 from the entry points 138, 140 for 360° back to the entry points 138, 140.

The squeegee blade 40 is elongated axially, i.e., parallel to the axis A, from the top ring 42 to the bottom ring 44. The squeegee blade 40 is mounted to the squeegee holder 116 by being inserted into the squeegee-blade slot 120. An axial length of the squeegee blade 40 is substantially equal to an axial length of the axial gap 46.

The squeegee blade 40 includes at least one, e.g., two, resilient members 142. The squeegee blade 40 is inserted into the squeegee-blade slot 120 with the resilient member 142 first, with the resilient members 142 contacting the squeegee holder 116 inside the squeegee-blade slot 120. The resilient members 142 bias the squeegee blade 40 away from the squeegee holder 116, i.e., in a direction out of the squeegee-blade slot 120, i.e., radially inward against the cylindrical sensor window 50.

The squeegee blade 40 is in the first position when the pegs 122, 124 are placed in the entry points 138, 140, and the second position is the same as the first position. The squeegee blade 40 is moved from the first position to the second position by sliding the pegs 122, 124 in the tracks 130, 132 for 360° around the axis A from the entry points 138, 140 back to the entry points 138, 140. Moving the squeegee blade 40 from the first position to the second position covers substantially an entire surface area of the cylindrical sensor window 50. The squeegee blade 40 extends an entire axial length of the cylindrical sensor window 50, and moving the squeegee blade 40 from the first position to the second position covers an entire circumference of the cylindrical sensor window 50.

With reference to FIGS. 12-13, in the third example of the film-application apparatus 30, the film-application apparatus 30 includes the same components as in the second example, as well as the film roller 98. The film roller 98 is rotatably coupled to the squeegee holder 116. The film roller 98 has an axis of rotation parallel to the axis A. An axial length and axial positioning of the film roller 98 are the same as the squeegee blade 40. When the squeegee holder 116 and squeegee blade 40 are moved from the first position to the second position, the film 52 unrolls from the film roller 98 and is pressed against the cylindrical sensor window 50 by the squeegee blade 40.

Figure 14:
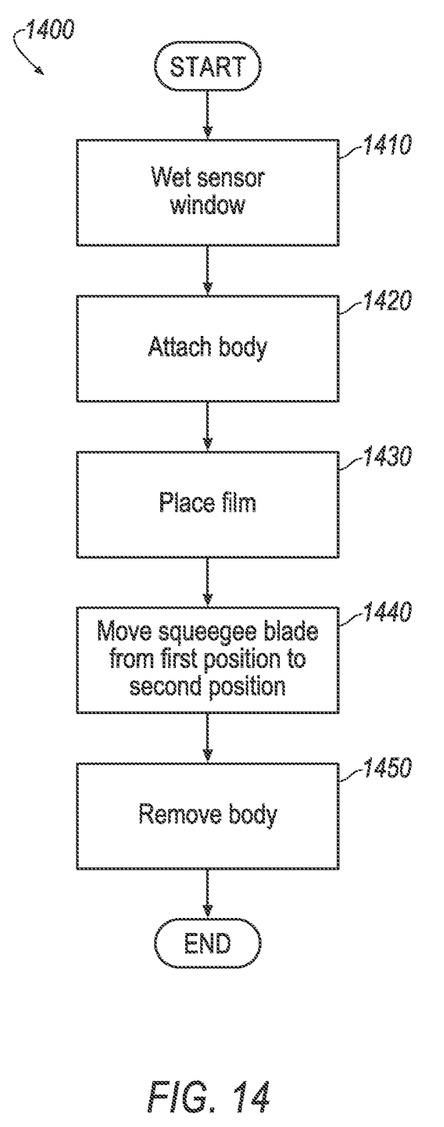
FIG. 14 is a process flow diagram of a first example process for applying a film to the sensor.

FIG. 14 is a process flow diagram illustrating an exemplary process 1400 for applying the film 52 to the cylindrical sensor window 50 of the sensor 48. As a general overview of the process 1400, a technician wets the cylindrical sensor window 50, attaches the body 32 around the sensor 48, places the film 52 on the cylindrical sensor window 50, moves the squeegee blade 40 from the first position to the second position, and removes the body 32 from the sensor 48. The process 1400 can be performed using the first example or the second example of the film-application apparatus 30.

The process 1400 begins in a block 1410, in which the technician wets the cylindrical sensor window 50 with a liquid such as water, e.g., using a spray bottle (not shown). The liquid permits the technician to slide and reposition the film 52 once applied to the cylindrical sensor window 50.

Next, in a block 1420, the technician attaches the body 32 to the sensor 48. The technician places the body 32 with the second body half 36 in the open position around the sensor 48 and then moves the second body half 36 to the closed position. The technician locks the body halves 34, 36 together using the closure points 96, as well as possibly by attaching the clamp halves 102 together in the groove 110.

Next, in a block 1430, the technician applies the film 52 to the cylindrical sensor window 50. The technician can use the top ring 42 and the bottom ring 44 as guides to ensure that the film 52 is placed in the correct location. The film 52 is placed so as to completely cover the cylindrical sensor window 50.

Next, in a block 1440, the technician moves the squeegee blade 40 from the first position to the second position, either by dragging the squeegee blade 40 downward from the top ring 42 to the bottom ring 44 or by dragging the squeegee holder 116 circumferentially from the entry points 138, 140 back to the entry points 138, 140. The squeegee blade 40 moves across substantially all the film 52, i.e., substantially all the cylindrical sensor window 50. The movement of the squeegee blade 40 squeezes out the liquid, removes bubbles from between the film 52 and the cylindrical sensor window 50, and firmly presses the film 52 against the cylindrical sensor window 50 to form a firm bond.

Next, in a block 1450, the technician removes the body 32 by opening the body halves 34, 36 and taking the body 32 away from the sensor 48. After the block 1450, the process 1400 ends.

Figure 15:
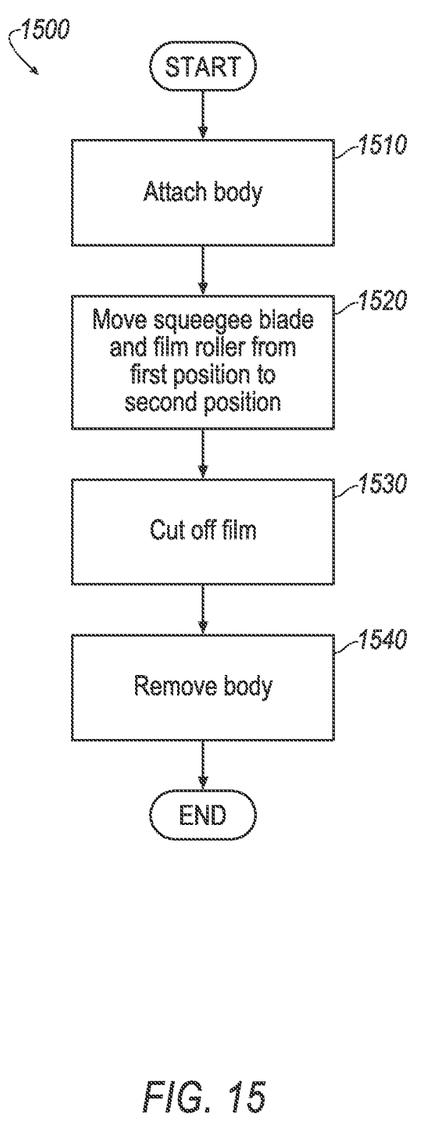
FIG. 15 is a process flow diagram of a second example process for applying a film to the sensor.

FIG. 15 is a process flow diagram illustrating an exemplary process 1500 for applying the film 52 to the cylindrical sensor window 50 of the sensor 48. As a general overview of the process 1500, a technician attaches the body 32 around the sensor 48, moves the squeegee blade 40 and the film roller 98 from the first position to the second position, cuts off the film 52, and removes the body 32 from the sensor 48. The process 1500 is performed using the third example of the film-application apparatus 30.

The process 1500 begins in a block 1510, in which the technician attaches the body 32 to the sensor 48. The technician places the body 32 with the second body half 36 in the open position around the sensor 48 and then moves the second body half 36 to the closed position. The technician locks the body halves 34, 36 together using the closure points 96.

Next, in a block 1520, the technician moves the squeegee blade 40 and the film roller 98 from the first position to the second position by dragging the squeegee holder 116 circumferentially from the entry points 138, 140 back to the entry points 138, 140. The film 52 unrolls from the film roller 98 and feeds underneath the squeegee blade 40. The squeegee blade 40 moves across the film 52 and applies the film 52 to the cylindrical sensor window 50, removing bubbles from between the film 52 and the cylindrical sensor window 50 and firmly pressing the film 52 against the cylindrical sensor window 50 to form a firm bond.

Next, in a block 1530, the technician cuts the film 52 to separate the film 52 on the film roller 98 from the film 52 on the cylindrical sensor window 50. The cut can be made along the squeegee blade 40.

Next, in a block 1540, the technician removes the body 32 by opening the body halves 34, 36 and taking the body 32 away from the sensor 48. After the block 1540, the process 1500 ends.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A film-application apparatus comprising:
a body including a first body half, a second body half, and a hinge coupling the body halves; and
a squeegee blade movable from a first position relative to the body to a second position relative to the body;
wherein the second body half is rotatable about the hinge relative to the first body half to a closed position;
when the second body half is in the closed position, the body includes a top ring and a bottom ring both centered on an axis and defining an axial gap therebetween; and
when the second body half is in the closed position and the body is enclosing a sensor having a cylindrical sensor window, the axial gap exposes the cylindrical sensor window, and moving the squeegee blade from the first position to the second position covers substantially an entire surface area of the cylindrical sensor window.

2. The film-application apparatus of claim 1, wherein the top ring includes a top interior cylindrical surface, the bottom ring includes a bottom interior cylindrical surface, and a radius of the top interior cylindrical surface is substantially equal to a radius of the bottom interior cylindrical surface.

3. The film-application apparatus of claim 1, wherein each body half includes a top half-ring and a bottom half-ring, and when the second body half is in the closed position, the two top half-rings form the top ring and the two bottom half-rings form the bottom ring.

4. The film-application apparatus of claim 3, wherein each body half includes a linkage connecting the respective top half-ring and the respective bottom half-ring, and each linkage is radially outside the respective top and bottom half-rings.

5. The film-application apparatus of claim 4, wherein the hinge couples the two linkages together.

6. The film-application apparatus of claim 3, wherein each top half-ring includes a top interior half-cylindrical surface, and each bottom half-ring includes a bottom interior half-cylindrical surface.

7. The film-application apparatus of claim 1, wherein the squeegee blade has an annular shape, the squeegee blade in the first position is at the top ring, and the squeegee blade in the second position is at the bottom ring.

8. The film-application apparatus of claim 1, further comprising a circular clamp, wherein one of the top ring or the bottom ring includes an exterior circular groove sized to receive the circular clamp.

9. The film-application apparatus of claim 8, wherein the squeegee blade has an annular shape, the squeegee blade in the first position is abutting the clamp, and the squeegee blade in the second position is abutting the other of the top ring or the bottom ring.

10. The film-application apparatus of claim 1, wherein the squeegee blade is elongated from the top ring to the bottom ring parallel to the axis.

11. The film-application apparatus of claim 10, further comprising a squeegee holder extending from the top ring to the bottom ring, wherein the squeegee blade is mounted to the squeegee holder.

12. The film-application apparatus of claim 11, wherein the squeegee blade includes a resilient member contacting the squeegee holder and biasing the squeegee blade away from the squeegee holder.

13. The film-application apparatus of claim 11, wherein the top ring includes a top track, the bottom ring includes a bottom track, and the squeegee holder includes a top peg slidable in the top track and a bottom peg slidable in the bottom track.

14. The film-application apparatus of claim 13, wherein the top ring includes a top exterior cylindrical surface, the bottom ring includes a bottom exterior cylindrical surface, the top track extends circumferentially along the top exterior cylindrical surface, and the bottom track extends circumferentially along the bottom exterior cylindrical surface.

15. The film-application apparatus of claim 13, wherein the top track includes a top entry point, the bottom track includes a bottom entry point, the top peg is removable from the top track only at the top entry point, and the bottom peg is removable from the bottom track only at the bottom entry point.

16. The film-application apparatus of claim 11, further comprising a film roller rotatably coupled to the squeegee holder.

17. The film-application apparatus of claim 16, wherein the film roller has an axis of rotation parallel to the axis.

* * * * *